US012443860B2

United States Patent
Subramanian et al.

(10) Patent No.: US 12,443,860 B2
(45) Date of Patent: Oct. 14, 2025

(54) SYSTEMS AND METHODS FOR GENERATING CUSTOMER JOURNEYS FOR AN APPLICATION BASED ON PROCESS MANAGEMENT RULES

(71) Applicant: Verizon Patent and Licensing Inc., Basking Ridge, NJ (US)

(72) Inventors: Senthilnathan Subramanian, Hyderabad (IN); Ramasubramanian Rajakumar, Chennai (IN); Sivaramchandhar Venkatachalapathy, Tamil Nadu (IN); Sunanda V. Asam, Hyderabad (IN)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 983 days.

(21) Appl. No.: 17/243,778

(22) Filed: Apr. 29, 2021

(65) Prior Publication Data
US 2022/0351054 A1    Nov. 3, 2022

(51) Int. Cl.
| | |
|---|---|
| *G06N 5/025* | (2023.01) |
| *G06F 16/951* | (2019.01) |
| *G06F 16/9538* | (2019.01) |
| *G06N 5/01* | (2023.01) |

(52) U.S. Cl.
CPC .......... *G06N 5/025* (2013.01); *G06F 16/951* (2019.01); *G06F 16/9538* (2019.01); *G06N 5/01* (2023.01)

(58) Field of Classification Search
CPC ........ G06N 5/025; G06N 5/01; G06F 16/951; G06F 16/9538; G06Q 30/01; G06Q 30/0201; G06Q 30/0631
See application file for complete search history.

(56) References Cited

U.S. PATENT DOCUMENTS

| | | | |
|---|---|---|---|
| 2009/0125802 A1* | 5/2009 | Chen | G06F 40/143 715/234 |
| 2013/0054349 A1* | 2/2013 | Ogawa | G06Q 30/00 705/14.43 |
| 2013/0151300 A1* | 6/2013 | Le Chevalier | G06Q 50/20 705/7.15 |
| 2016/0070791 A1* | 3/2016 | Eberhart | G06F 16/951 707/706 |
| 2018/0036591 A1* | 2/2018 | King | H04N 5/76 |
| 2019/0065017 A1* | 2/2019 | Keller | G09B 5/02 |
| 2019/0077009 A1* | 3/2019 | Huang | B25J 11/0005 |
| 2020/0349219 A1* | 11/2020 | Veselov | G06F 40/166 |
| 2021/0352160 A1* | 11/2021 | Jackson | H04L 67/02 |

* cited by examiner

*Primary Examiner* — Hope C Sheffield (57) ABSTRACT

A device may receive an application that includes one or more pages and may receive rules data identifying rules to construct customer journeys. The device may analyze the rules data to identify entry and exit criteria for each page of the application and may create map data based on the entry and exit criteria for each page of the application. The device may construct a causation map for the application based on the map data and may identify potential customer journeys for the application based on the causation map. The device may execute the potential customer journeys to generate customer journey results and may perform one or more actions based on the customer journey results.

20 Claims, 9 Drawing Sheets

SYSTEMS AND METHODS FOR GENERATING CUSTOMER JOURNEYS FOR AN APPLICATION BASED ON PROCESS MANAGEMENT RULES

BACKGROUND

An enterprise architecture enables end-to-end unified business processes across all systems and delivers highly personalized omni-channel experiences for customers. The enterprise architecture achieves efficiency and speed by standardizing technologies and aligning capabilities to improve reusability.

DETAILED DESCRIPTION OF PREFERRED EMBODIMENTS

The following detailed description of example implementations refers to the accompanying drawings. The same reference numbers in different drawings may identify the same or similar elements.

An enterprise architecture utilizes a process management platform to drive a customer journey, a customer experience, and decisioning associated with an application. The process management platform combines digital, online, chat, call centers, and in-store systems into a single ecosystem. The process management platform generates rules, conditions, available paths, and/or the like that are used to construct a customer journey for the application and to discover all possible customer journeys for the application. Current techniques for testing a customer journey of an application require an application tester to create tests that build the customer journey based on user stories. However, the current techniques are unable to ensure that all possible customer journeys for an application are discovered. Thus, current techniques fail to determine customer journey coverage of an application, leading to incomplete testing. Furthermore, it is time consuming to create the tests, and the tests require supervisory review to ensure proper coverage for customer journeys.

Thus, current techniques for testing a customer journey of an application consume computing resources (e.g., processing resources, memory resources, communication resources, and/or the like), network resources, and/or other resources associated with generating tests that fail to determine customer journey coverage of an application, executing the tests, unsuccessfully attempting to confirm coverage of all possible customer journeys for an application, and utilizing an application with unconfirmed customer journey coverage, among other examples.

Some implementations described herein relate to a customer journey system that generates customer journeys for an application based on process management rules. For example, the customer journey system may receive an application that includes one or more pages and may receive rules data identifying rules to construct customer journeys. The customer journey system may analyze the rules data to identify entry (e.g., entry, process in, step in, and/or the like) and exit (e.g., exit, process out, step out, and/or the like) criteria for each page of the application and may create map data based on the entry and exit criteria for each page of the application. The customer journey system may construct a causation map for the application based on the map data and may identify potential customer journeys for the application based on the causation map. The customer journey system may execute the potential customer journeys to generate customer journey results and may perform one or more actions based on the customer journey results.

In this way, the customer journey system may generate customer journeys for an application based on process management rules. The customer journey system may combine individual rules generated by a process management platform to construct a customer journey and may discover all possible customer journeys using available paths generated based on combining the individual rules. The customer journey system may generate tests to traverse through all the possible customer journey paths to ensure coverage of all the possible customer journeys. This, in turn, conserves computing resources, networking resources, and/or other resources that would otherwise have been consumed with generating tests that fail to determine customer journey coverage of an application, executing the tests, unsuccessfully attempting to confirm coverage of all possible customer journeys for an application, utilizing an application with unconfirmed customer journey coverage, among other examples.

FIGS. 1A-1F are diagrams of an example 100 associated with generating customer journeys for an application based on process management rules. As shown in FIGS. 1A-1F, example 100 includes a server device 105 and a customer journey system 110. Further details of the server device 105 and the customer journey system 110 are provided elsewhere herein.

Figure 1A:
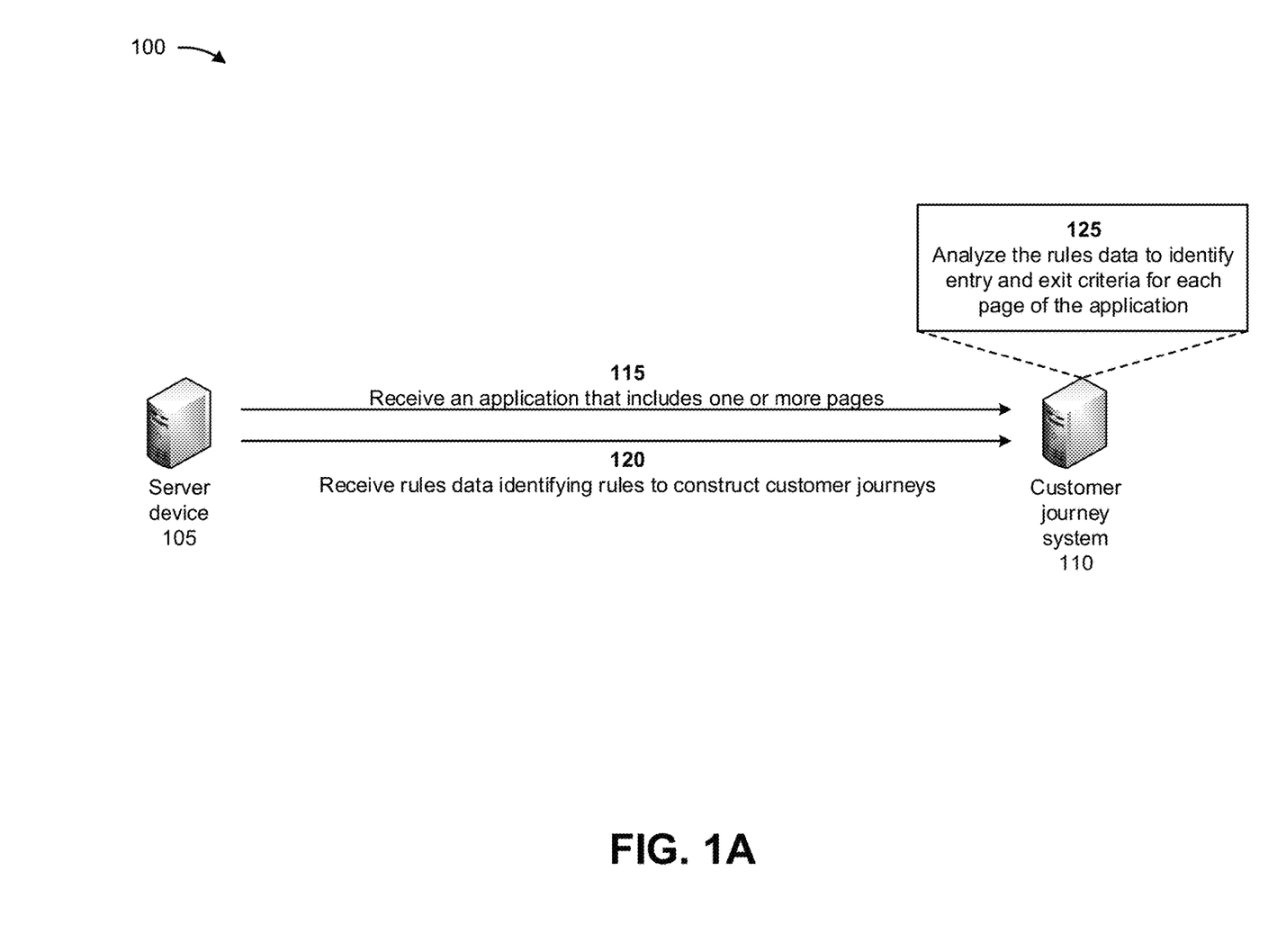
FIGS. 1A-1F are diagrams of an example associated with generating customer journeys for an application based on process management rules.

As shown in FIG. 1A, and by reference number 115, the customer journey system 110 may receive, from the server device 105, an application that includes one or more pages. The one or more pages of the application may be utilized to create a customer journey (e.g., through different pages, sections, components, different navigations, modules, and/or the like of the application), to create a customer experience (e.g., through different pages of the application), to enable a customer to make decision (e.g., to purchase a product and/or a service), and/or the like. The application may combine digital, online, chat, call centers, in-store systems, and/or the like into a single platform. For example, the application may offer products and/or services to a customer, enable the customer to browse the products and/or services, enable the customer to purchase the products and/or services, enable the customer to request online chat about the products and/or services, and/or the like via the one or more pages of the application.

As further shown in FIG. 1A, and by reference number 120, the customer journey system 110 may receive, from the service device 105, rules data identifying rules to construct customer journeys. The rules data may include data identifying rules, conditions, available paths, and/or the like that are used to construct a customer journey, to create a customer experience, to enable a customer to make decision (e.g., to purchase a product and/or a service), and/or the like via different pages of the application. For example, if the customer purchases a product via the application and selects a checkout option, the rules data may instruct the application to open a page associated with receiving payment information from the customer. In some implementations, the rules data includes a decision table associated with the rules, the conditions, the available paths, entry into and out of application pages, sections, components, different navigations, and/or modules, and/or the like that are used to construct customer journeys.

As further shown in FIG. 1A, and by reference number 125, the customer journey system 110 may analyze the rules data to identify entry and exit criteria for each page of the application. The entry and exit criteria for a page may include one or more conditions to be satisfied in order to present the page (e.g., enter the page) to a customer, one or more conditions to be satisfied in order to exit the page and present another page to the customer, and/or the like. The entry criteria may include criteria associated with an entry, a process in, a step in, and/or the like. The exit criteria may include criteria associated with an exit, a process out, a step out, and/or the like. The customer journey system 110 may analyze code of the application for conditional statements to identify conditions associated with the application. For a page of the application, the customer journey system 110 may determine which of the identified conditions are associated with entering the page and may label such as conditions as entry criteria for the page. The customer journey system 110 may determine which of the identified conditions are associated with exiting the page and may label such as conditions as exit criteria for the page. The customer journey system 110 may repeat this procedure for each page of the application.

In some implementations, the customer journey system 110 validates the rules data prior to analyzing the rules data to identify the entry and exit criteria for each page of the application. For example, the customer journey system 110 may compare each of the rules, the conditions, the available paths, and/or the like of the rules data with historical rules, historical conditions, historical available paths, and/or the like associated with applications similar to the application to determine whether the rules data matches one or more of the historical rules, the historical conditions, the historical available paths, and/or the like. The customer journey system 110 may validate the rules data based on such a comparison and may discard rules data that fails to match one or more of the historical rules, the historical conditions, the historical available paths, and/or the like.

Figure 1B:
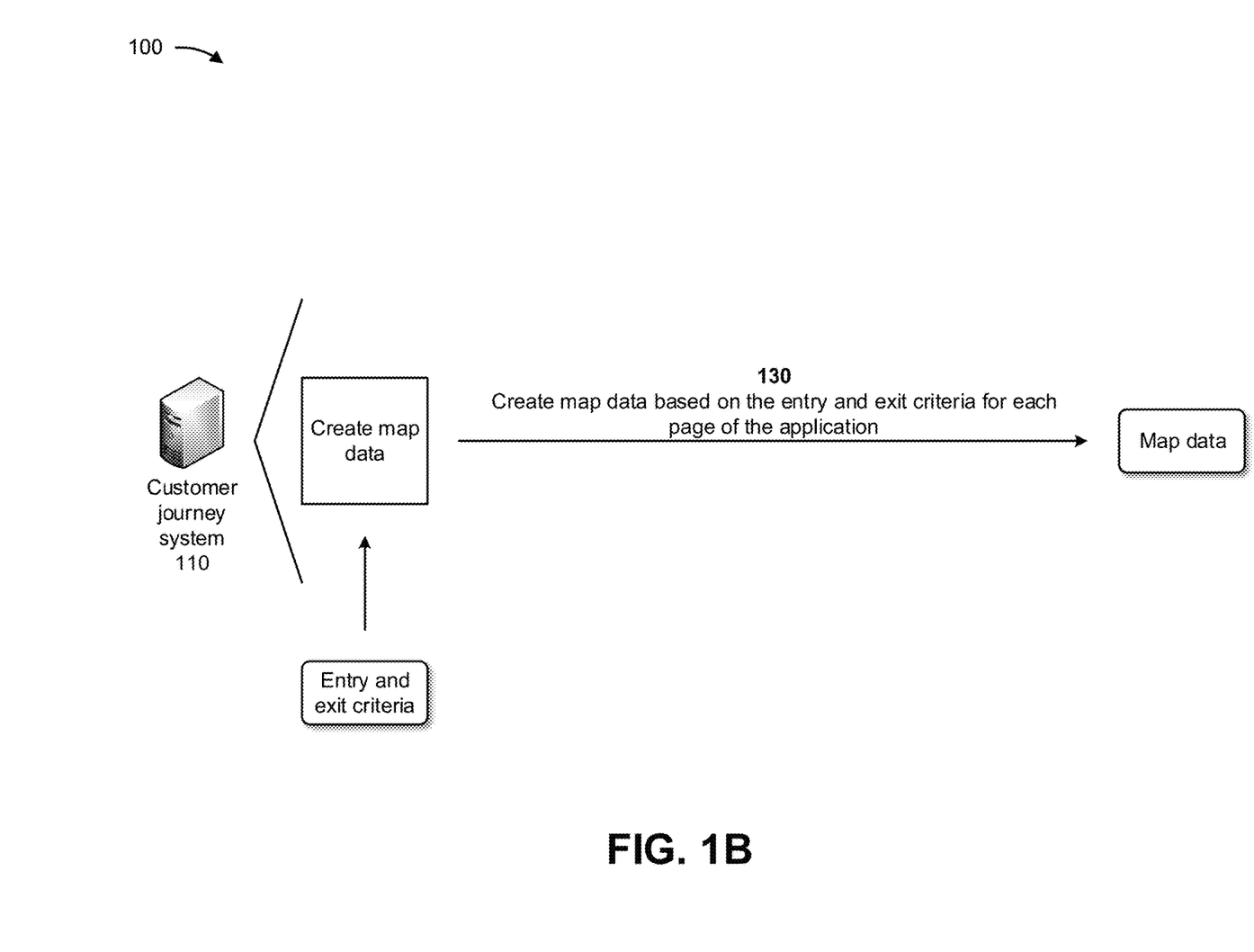

As shown in FIG. 1B, and by reference number 130, the customer journey system 110 may create map data based on the entry and exit criteria for each page of the application. The map data may include data identifying interrelations between pages of the application, relationships between exit criteria of a page of the application and entry criteria of one or more other pages of the application, relationships between entry criteria of a page of the application and exit criteria of one or more other pages of the application, and/or the like. For example, a first page of the application may be associated with first exit criteria, and the first exit criteria may constitute entry criteria for a second page and a third page of the application. In such an example, the map data may include data identifying the relationship between first exit criteria, the first page, the second page, and the third page. In another example, a fourth page of the application may be associated with a fourth entry criteria, and the fourth entry criteria may constitute exit criteria for a fifth page of the application. In such an example, the map data may include data identifying the relationship between the fourth entry criteria, the fourth page, and the fifth page.

In some implementations, when creating the map data based on the entry and exit criteria for each page of the application, the customer journey system 110 may process the entry and exit criteria for each page of the application, with a model, to eliminate loops in the customer journey. In some implementations, the model may include a machine learning model designed to determine whether any of the entry and exit criteria create loops between the pages of the application, to identify the interrelations between the pages of the application, to identify relationships between exit criteria of a page of the application and entry criteria of one or more other pages of the application, to identify the relationships between entry criteria of a page of the application and exit criteria of one or more other pages of the application, and/or the like. The machine learning model may output the map data based on the identified interrelations and the identified relationships.

Figure 1C:
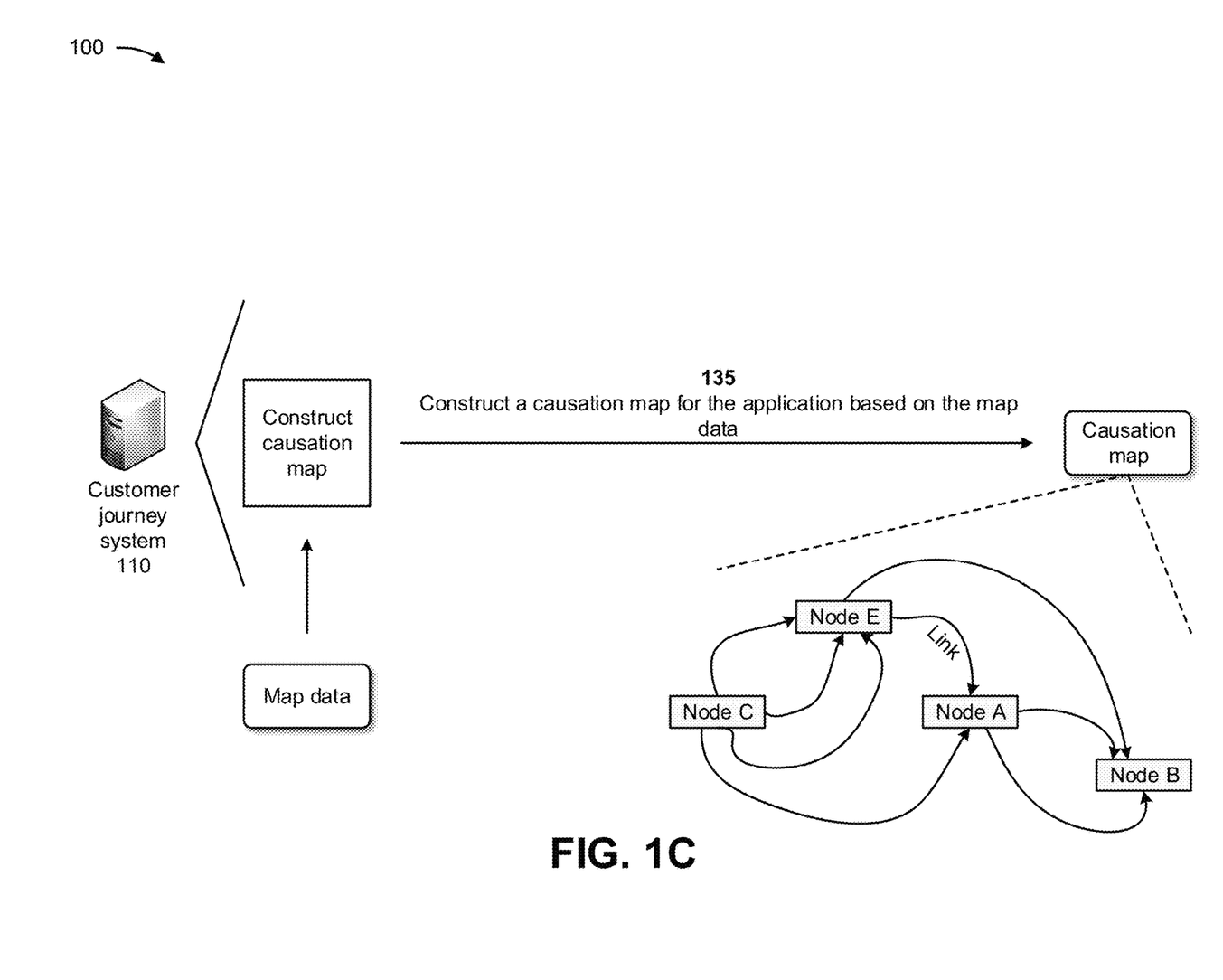

As shown in FIG. 1C, and by reference number 135, the customer journey system 110 may construct a causation map for the application based on the map data. A causation map may include a network diagram with links or arcs between nodes or factors, such that a link between node C and node E means that node C has some causal influence on node E. In some implementations, the causation map may include nodes that are representations of the pages of the application and links that are representations of the entry and exit criteria for the pages of the application. For example, a first page of the application may be associated with first exit criteria, and the first exit criteria may constitute entry criteria for a second page and a third page of the application. In such an example, the causation map may include nodes representing the first page, the second page, and the third page, and two links representing the first exit criteria (e.g., a first link between a first page node and a second page node and representing the first exit criteria of the first page node and the entry criteria of the second page node, and a second link between the first page node and a third page node and representing the first exit criteria of the first page node and the entry criteria of the third page node). The customer journey system 110 may utilize the interrelationships and the relationships defined in the map data to build the causation map.

Figure 1D:
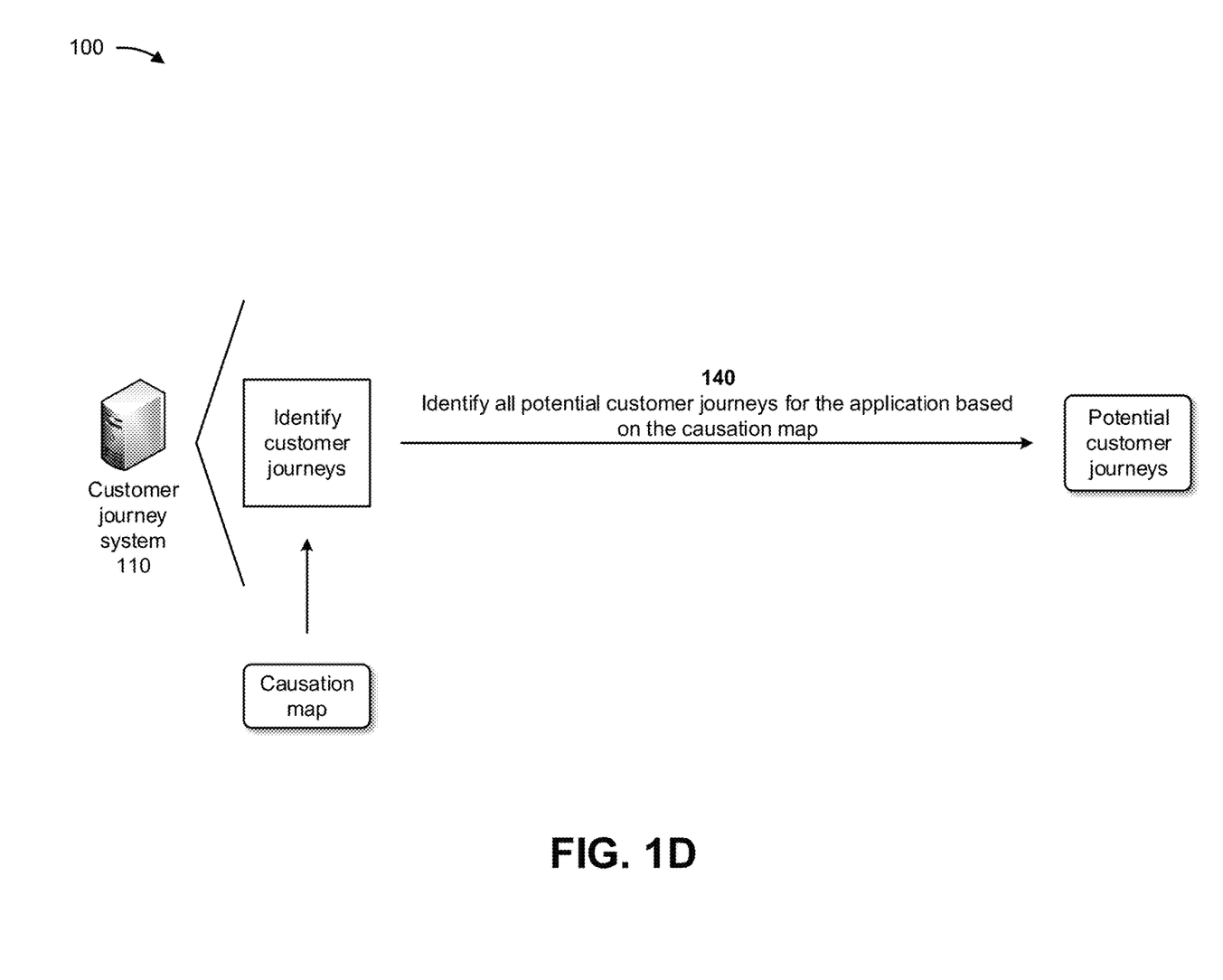

As shown in FIG. 1D, and by reference number 140, the customer journey system 110 may identify all potential customer journeys for the application based on the causation map. In some implementations, the potential customer journeys are associated with a cross-channel customer transaction experience (e.g., a customer plan change, an upgrade for a customer, a customer adding a new service or product, and/or the like); an end-to-end orchestrated customer journey (e.g., bundled products and services for a customer, customer order information, resolution of issues for a customer, handling a bill dispute with a customer, and/or the like); a communications customer journey (e.g., product and/or service recommendations, personalization of a customer experience, and/or the like), a personalized offer for a customer (e.g., rebates, transaction cards, product offers, service offers, and/or the like); and/or the like.

The customer journey system 110 may identify the potential customer journeys for the application by tracing through the nodes and the links of the causation map and creating paths among the nodes (e.g., the pages of the application) based on tracing through the nodes and the links of the causation map. Each of the paths may correspond to the potential customer journeys and may include one or more of the nodes (e.g., pages of the application) of the causation map and one or more links (e.g., the entry and exit criteria) of the causation map. In some implementations, the customer journey system 110 may utilize the causation map and functional testing (e.g., an automated testing framework used to validate applications across different browsers and platforms) to trace through and identify all of the potential customer journeys for the application. In this way, the customer journey system 110 may identify and ensure coverage of all potential customer journeys for the application so that testers of the application need not create tests to confirm coverage of all possible customer journeys for the application.

In some implementations, the customer journey system 110 may receive a change to the rules data or to the application and may modify the potential customer journeys for the application based on the change to the rules data or the application. For example, the customer journey system 110 may utilize the change to the rules data or the application to modify the entry and exit criteria and may create modified map data based on modifying the entry and exit criteria. The customer journey system 110 may modify the causation map based on the modified map data and may modify the potential customer journeys for the application based on modifying the causation map.

Figure 1E:
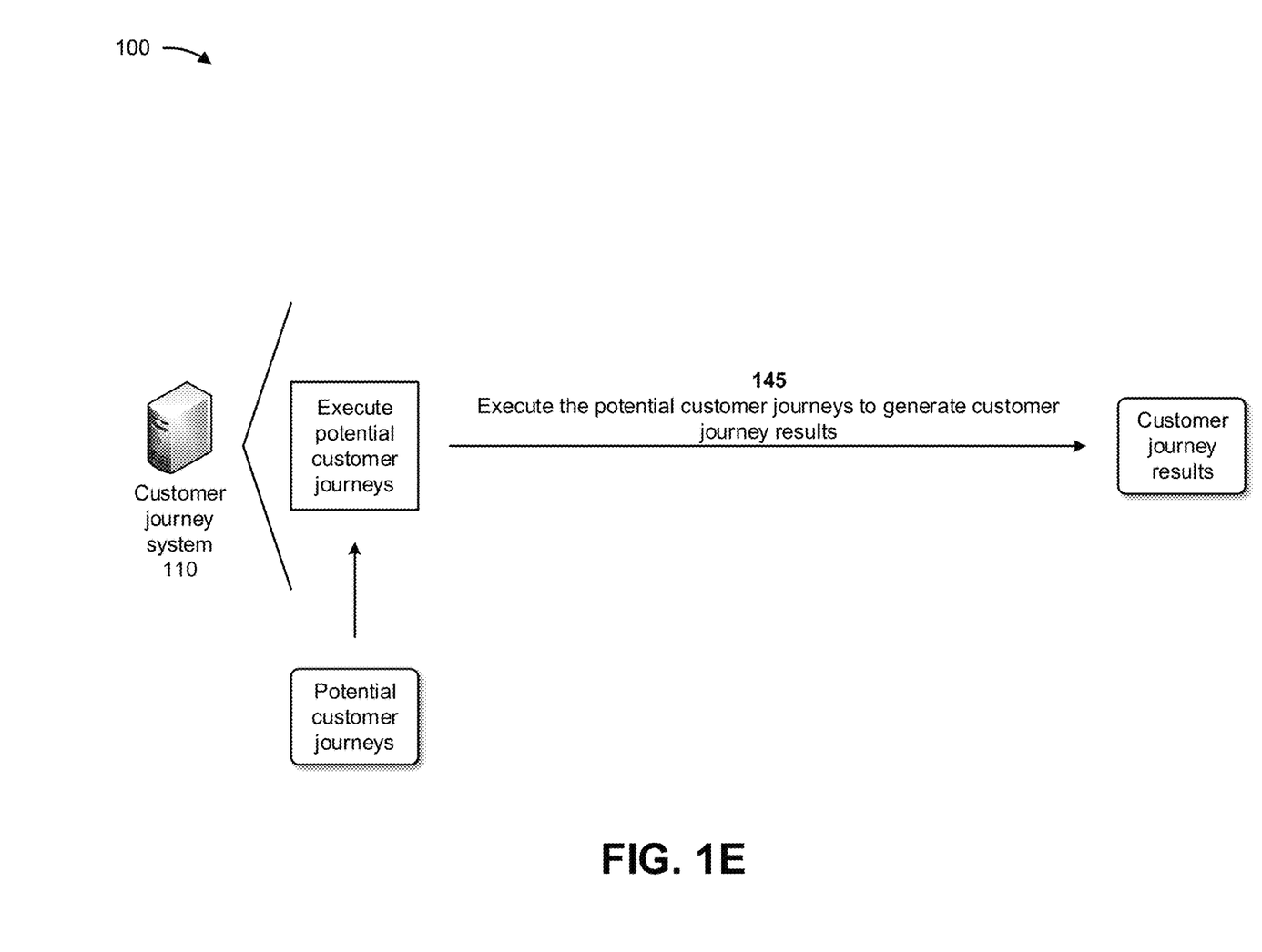

As shown by FIG. 1E, and reference number 145, the customer journey system 110 may execute the potential customer journeys to generate customer journey results. In some implementations, the customer journey results indicate invalid customer journeys of the potential customer journeys, valid customer journeys of the potential customer journeys, and/or the like. When executing the potential customer journeys to generate the customer journey results, the customer journey system 110 may generate tests from the potential customer journeys and may execute the tests to generate the customer journey results. For example, the customer journey system 110 may generate tests that trace through the paths of the potential customer journeys and may execute the tests to determine whether one or more of the paths successfully complete one or more of the potential customer journeys (e.g., indicating valid customer journeys). The customer journey system 110 may execute the tests to determine whether one or more of the paths unsuccessfully complete one or more of the potential customer journeys (e.g., indicating invalid customer journeys).

Figure 1F:
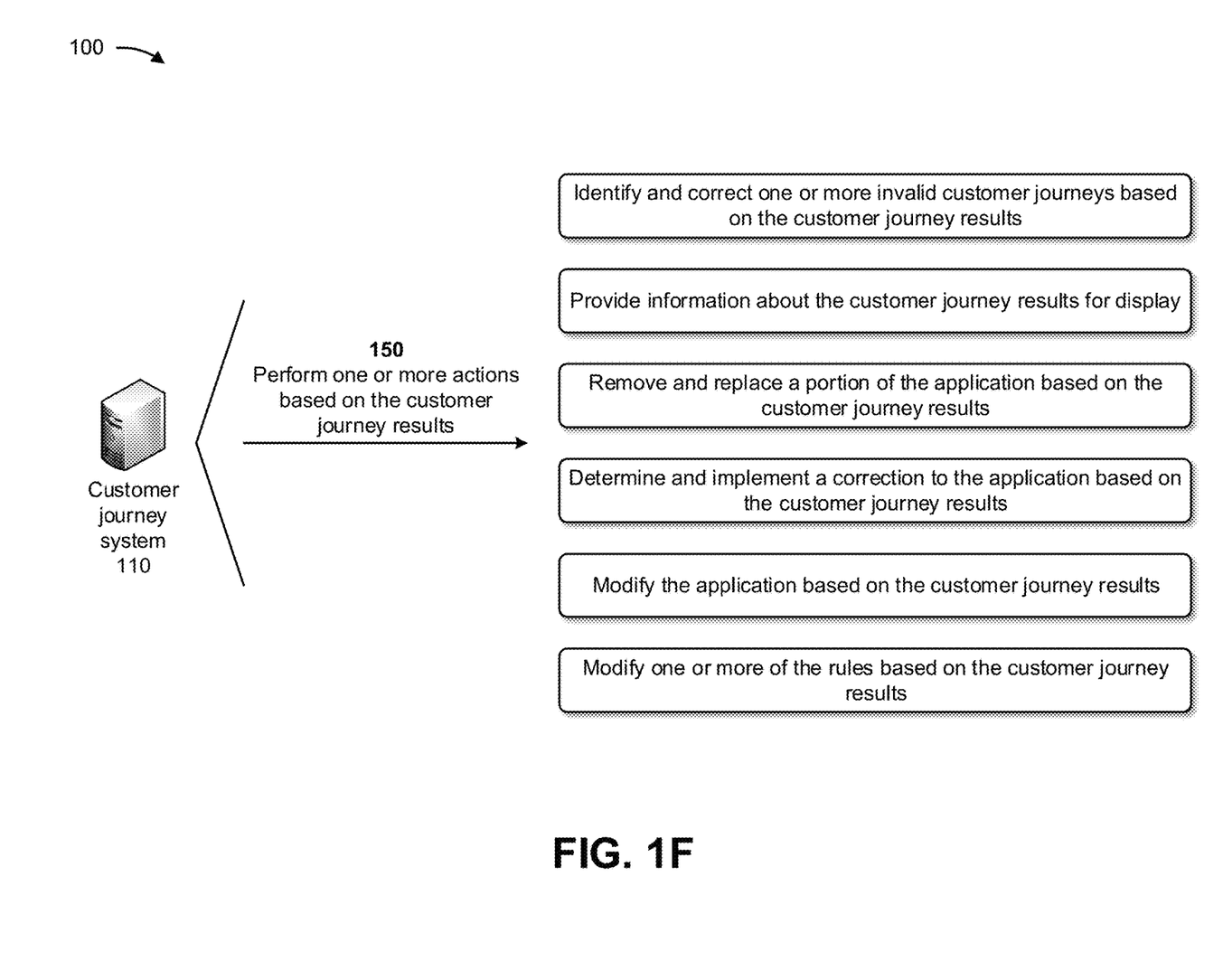

As shown in FIG. 1F, and by reference number 150, the customer journey system 110 may perform one or more actions based on the customer journey results. In some implementations, the one or more actions include the customer journey system 110 identifying one or more invalid customer journeys based on the customer journey results and correcting the one or more invalid customer journeys. For example, the customer journey system 110 may execute tests to determine whether one or more of the paths unsuccessfully complete one or more of the potential customer journeys (e.g., indicating invalid customer journeys). In this way, the customer journey system 110 may conserve computing resources, networking resources, and/or other resources that would otherwise have been consumed with utilizing an application with invalid customer journeys.

In some implementations, the one or more actions include the customer journey system 110 providing information about the customer journey results for display. For example, the customer journey system 110 may provide the information about the customer journey results for display to a tester of the application. The tester may utilize the information to correct invalid customer journeys, confirm coverage of the application, and/or the like. In this way, the customer journey system 110 may conserve computing resources, networking resources, and/or other resources that would otherwise have been consumed with unsuccessfully attempting to confirm coverage of all possible customer journeys for the application, utilizing the application with unconfirmed customer journey coverage, among other examples.

In some implementations, the one or more actions include the customer journey system 110 removing a links to and from a particular portion of the application based on the customer journey results and replacing the links to and from the portion of the application with other application target destinations. For example, the customer journey system 110 may identify one or more invalid customer journeys based on the customer journey results and may determine that a portion of the application is associated with the one or more invalid customer journeys. The customer journey system 110 may then replace the portion of the application with new application code that does not include invalid customer journeys. In this way, the customer journey system 110 may conserve computing resources, networking resources, and/or other resources that would otherwise have been consumed with utilizing an application with invalid customer journeys.

In some implementations, the one or more actions include the customer journey system 110 determining a correction to the application based on the customer journey results and implementing the correction to the application. For example, the customer journey system 110 may identify one or more invalid customer journeys based on the customer journey results and may correct a portion of the application that is associated with the one or more invalid customer journeys. In this way, the customer journey system 110 may conserve computing resources, networking resources, and/or other resources that would otherwise have been consumed with utilizing an application with invalid customer journeys.

In some implementations, the one or more actions include the customer journey system 110 modifying the application based on the customer journey results. For example, the customer journey system 110 may modify the application to ensure that the application only includes valid customer journeys. In this way, the customer journey system 110 may conserve computing resources, networking resources, and/or other resources that would otherwise have been consumed with unsuccessfully attempting to confirm coverage of all possible customer journeys for an application, utilizing an application with unconfirmed customer journey coverage, among other examples.

In some implementations, the one or more actions include the customer journey system 110 modifying one or more of the rules based on the customer journey results. For example, the customer journey system 110 may modify one or more rules of the rules data to ensure that the application only includes valid customer journeys. In this way, the customer journey system 110 may conserve computing resources, networking resources, and/or other resources that would otherwise have been consumed with unsuccessfully attempting to confirm coverage of all possible customer journeys for an application, utilizing an application with unconfirmed customer journey coverage, among other examples.

In some implementations, the customer journey system 110 may be utilized to determine architectural compliance of the application with predetermined standards, such as the rules data. For example, the customer journey system 110 may identify any deviations in a framework implementation of the application, may detect an experience change associated with the application, may provide visibility into business logic separation, and/or the like. In another example, the customer journey system 110 may be unable to identify rules data to connect particular process steps of the application and may determine that no process action is defined in the rules data to connect the particular process steps. In such an example, the customer journey system 110 may define a rule for connecting the particular process steps and may define a process action to connect the particular process steps.

In this way, the customer journey system 110 may generate customer journeys for an application based on process management rules. The customer journey system 110 may combine individual rules generated by a process management platform to construct a customer journey and may discover all possible customer journeys using available paths generated based on combining the individual rules. The customer journey system 110 may generate tests to traverse through all the possible customer journey paths to ensure coverage of all the possible customer journeys. This, in turn, conserves computing resources, networking resources, and/or other resources that would otherwise have been consumed with generating tests that fail to determine customer journey coverage of an application, executing the tests, unsuccessfully attempting to confirm coverage of all possible customer journeys for an application, utilizing an application with unconfirmed customer journey coverage, among other examples.

As indicated above, FIGS. 1A-1F are provided as an example. Other examples may differ from what is described with regard to FIGS. 1A-1F. The number and arrangement of devices shown in FIGS. 1A-1F are provided as an example. In practice, there may be additional devices, fewer devices, different devices, or differently arranged devices than those shown in FIGS. 1A-1F. Furthermore, two or more devices shown in FIGS. 1A-1F may be implemented within a single device, or a single device shown in FIGS. 1A-1F may be implemented as multiple, distributed devices. Additionally, or alternatively, a set of devices (e.g., one or more devices) shown in FIGS. 1A-1F may perform one or more functions described as being performed by another set of devices shown in FIGS. 1A-1F.

Figure 2:
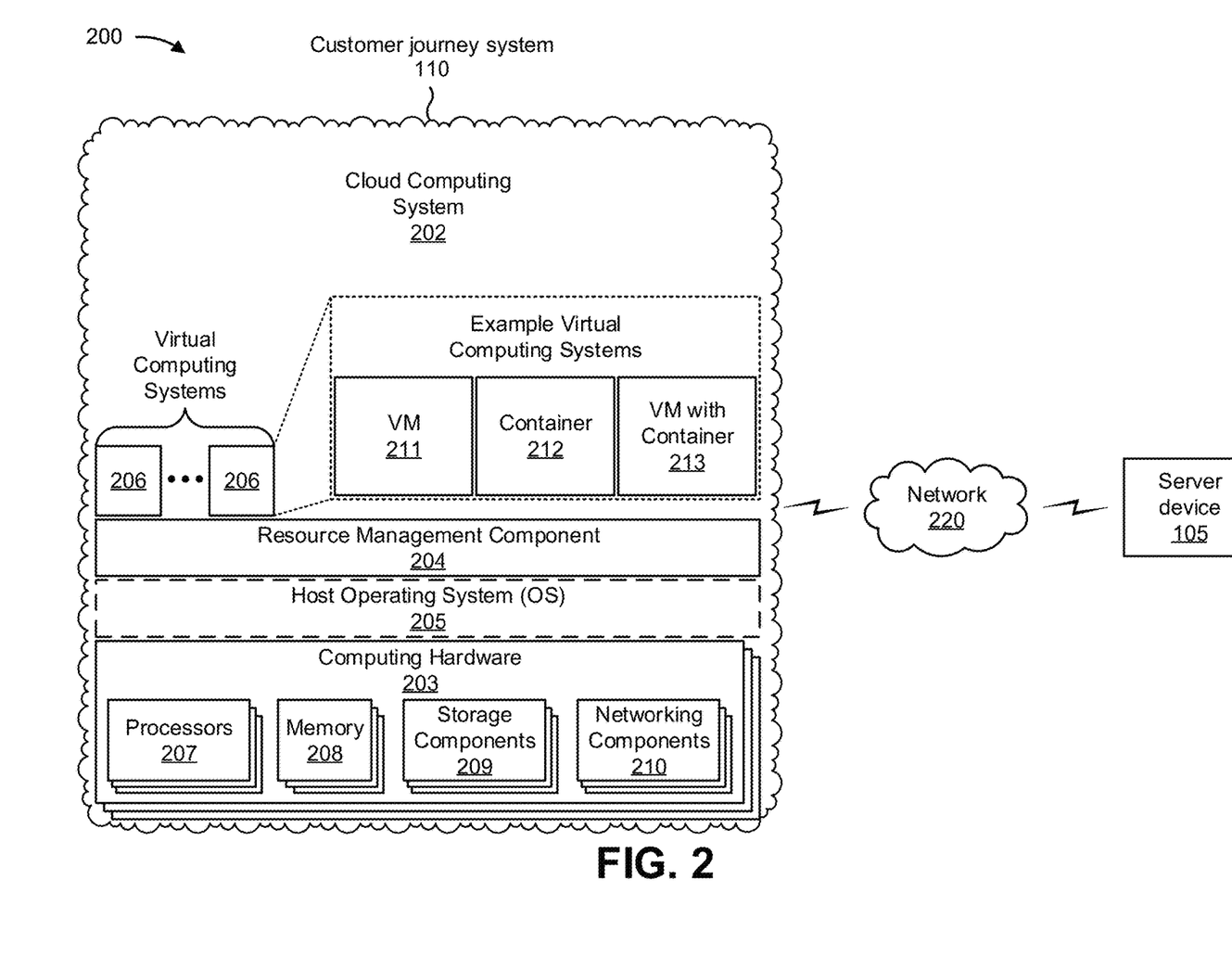
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include the customer journey system 110, which may include one or more elements of and/or may execute within a cloud computing system 202. The cloud computing system 202 may include one or more elements 203-213, as described in more detail below. As further shown in FIG. 2, environment 200 may include the server device 105 and/or a network 220. Devices and/or elements of environment 200 may interconnect via wired connections and/or wireless connections.

The user device 105 includes one or more devices capable of receiving, generating, storing, processing, and/or providing information, as described elsewhere herein. The user device 105 may include a communication device and/or a computing device. For example, the user device 105 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device.

The server device 105 includes one or more devices capable of receiving, generating, storing, processing, providing, and/or routing information, as described elsewhere herein. The server device 105 may include a communication device and/or a computing device. For example, the server device 105 may include a server, such as an application server, a client server, a web server, a database server, a host server, a proxy server, a virtual server (e.g., executing on computing hardware), or a server in a cloud computing system. In some implementations, the server device 105 includes computing hardware used in a cloud computing environment.

The cloud computing system 202 includes computing hardware 203, a resource management component 204, a host operating system (OS) 205, and/or one or more virtual computing systems 206. The resource management component 204 may perform virtualization (e.g., abstraction) of computing hardware 203 to create the one or more virtual computing systems 206. Using virtualization, the resource management component 204 enables a single computing device (e.g., a computer or a server) to operate like multiple computing devices, such as by creating multiple isolated virtual computing systems 206 from computing hardware 203 of the single computing device. In this way, computing hardware 203 can operate more efficiently, with lower power consumption, higher reliability, higher availability, higher utilization, greater flexibility, and lower cost than using separate computing devices.

The computing hardware 203 includes hardware and corresponding resources from one or more computing devices. For example, the computing hardware 203 may include hardware from a single computing device (e.g., a single server) or from multiple computing devices (e.g., multiple servers), such as multiple computing devices in one or more data centers. As shown, the computing hardware 203 may include one or more processors 207, one or more memories 208, one or more storage components 209, and/or one or more networking components 210. Examples of a processor, a memory, a storage component, and a networking component (e.g., a communication component) are described elsewhere herein.

The resource management component 204 includes a virtualization application (e.g., executing on hardware, such as computing hardware 203) capable of virtualizing computing hardware 203 to start, stop, and/or manage one or more virtual computing systems 206. For example, the resource management component 204 may include a hypervisor (e.g., a bare-metal or Type 1 hypervisor, a hosted or Type 2 hypervisor, or another type of hypervisor) or a virtual machine monitor, such as when the virtual computing systems 206 are virtual machines 211. Additionally, or alternatively, the resource management component 204 may include a container manager, such as when the virtual computing systems 206 are containers 212. In some implementations, the resource management component 204 executes within and/or in coordination with a host operating system 205.

A virtual computing system 206 includes a virtual environment that enables cloud-based execution of operations and/or processes described herein using computing hardware 203. As shown, the virtual computing system 206 may include a virtual machine 211, a container 212, or a hybrid environment 213 that includes a virtual machine and a container, among other examples. The virtual computing system 206 may execute one or more applications using a file system that includes binary files, software libraries, and/or other resources required to execute applications on a guest operating system (e.g., within the virtual computing system 206) or the host operating system 205.

Although the customer journey system 110 may include one or more elements 203-213 of the cloud computing system 202, may execute within the cloud computing system 202, and/or may be hosted within the cloud computing system 202, in some implementations, the customer journey system 110 may not be cloud-based (e.g., may be implemented outside of a cloud computing system) or may be partially cloud-based. For example, the customer journey system 110 may include one or more devices that are not part of the cloud computing system 202, such as device 300 of FIG. 3, which may include a standalone server or another type of computing device. The customer journey system 110 may perform one or more operations and/or processes described in more detail elsewhere herein.

The network 220 includes one or more wired and/or wireless networks. For example, the network 220 may include a cellular network, a public land mobile network (PLMN), a local area network (LAN), a wide area network (WAN), a private network, the Internet, and/or a combination of these or other types of networks. The network 220 enables communication among the devices of environment 200.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
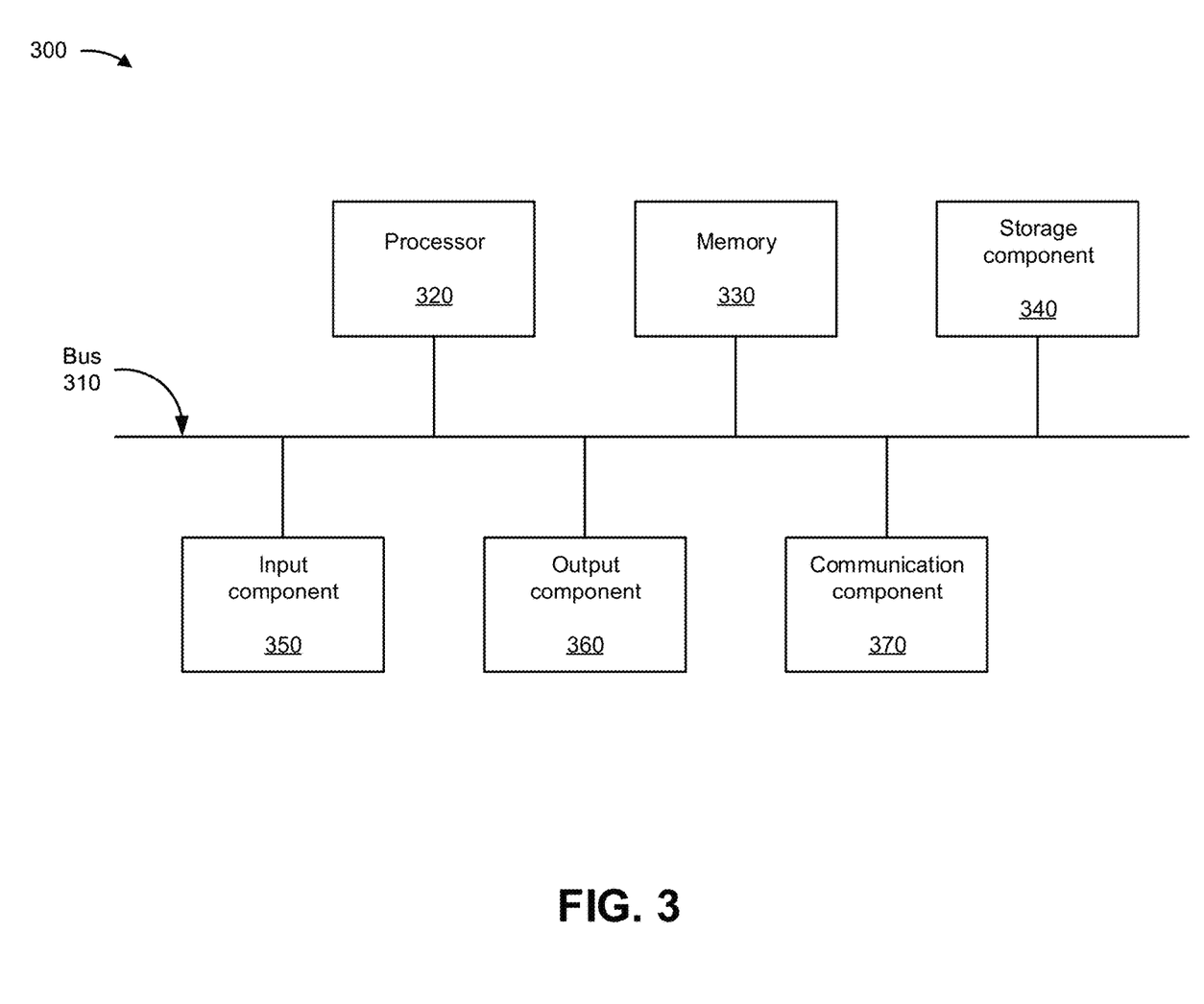
FIG. 3 is a diagram of example components of one or more devices of FIG. 2.

FIG. 3 is a diagram of example components of a device 300, which may correspond to the server device 105 and/or the customer journey system 110. In some implementations, the server device 105 and/or the customer journey system 110 may include one or more devices 300 and/or one or more components of device 300. As shown in FIG. 3, device 300 may include a bus 310, a processor 320, a memory 330, a storage component 340, an input component 350, an output component 360, and a communication component 370.

Bus 310 includes a component that enables wired and/or wireless communication among the components of device 300. Processor 320 includes a central processing unit, a graphics processing unit, a microprocessor, a controller, a microcontroller, a digital signal processor, a field-programmable gate array, an application-specific integrated circuit, and/or another type of processing component. Processor 320 is implemented in hardware, firmware, or a combination of hardware and software. In some implementations, processor 320 includes one or more processors capable of being programmed to perform a function. Memory 330 includes a random-access memory, a read only memory, and/or another type of memory (e.g., a flash memory, a magnetic memory, and/or an optical memory).

Storage component 340 stores information and/or software related to the operation of device 300. For example, storage component 340 may include a hard disk drive, a magnetic disk drive, an optical disk drive, a solid-state disk drive, a compact disc, a digital versatile disc, and/or another type of non-transitory computer-readable medium. Input component 350 enables the device 300 to receive input, such as user input and/or sensed inputs. For example, input component 350 may include a touch screen, a keyboard, a keypad, a mouse, a button, a microphone, a switch, a sensor, a global positioning system component, an accelerometer, a gyroscope, and/or an actuator. Output component 360 enables the device 300 to provide output, such as via a display, a speaker, and/or one or more light-emitting diodes. The communication component 370 enables the device 300 to communicate with other devices, such as via a wired connection and/or a wireless connection. For example, the communication component 370 may include a receiver, a transmitter, a transceiver, a modem, a network interface card, and/or an antenna.

The device 300 may perform one or more processes described herein. For example, a non-transitory computer-readable medium (e.g., memory 330 and/or storage component 340) may store a set of instructions (e.g., one or more instructions, code, software code, and/or program code) for execution by processor 320. Processor 320 may execute the set of instructions to perform one or more processes described herein. In some implementations, execution of the set of instructions, by one or more processors 320, causes the one or more processors 320 and/or the device 300 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

Figure 4:
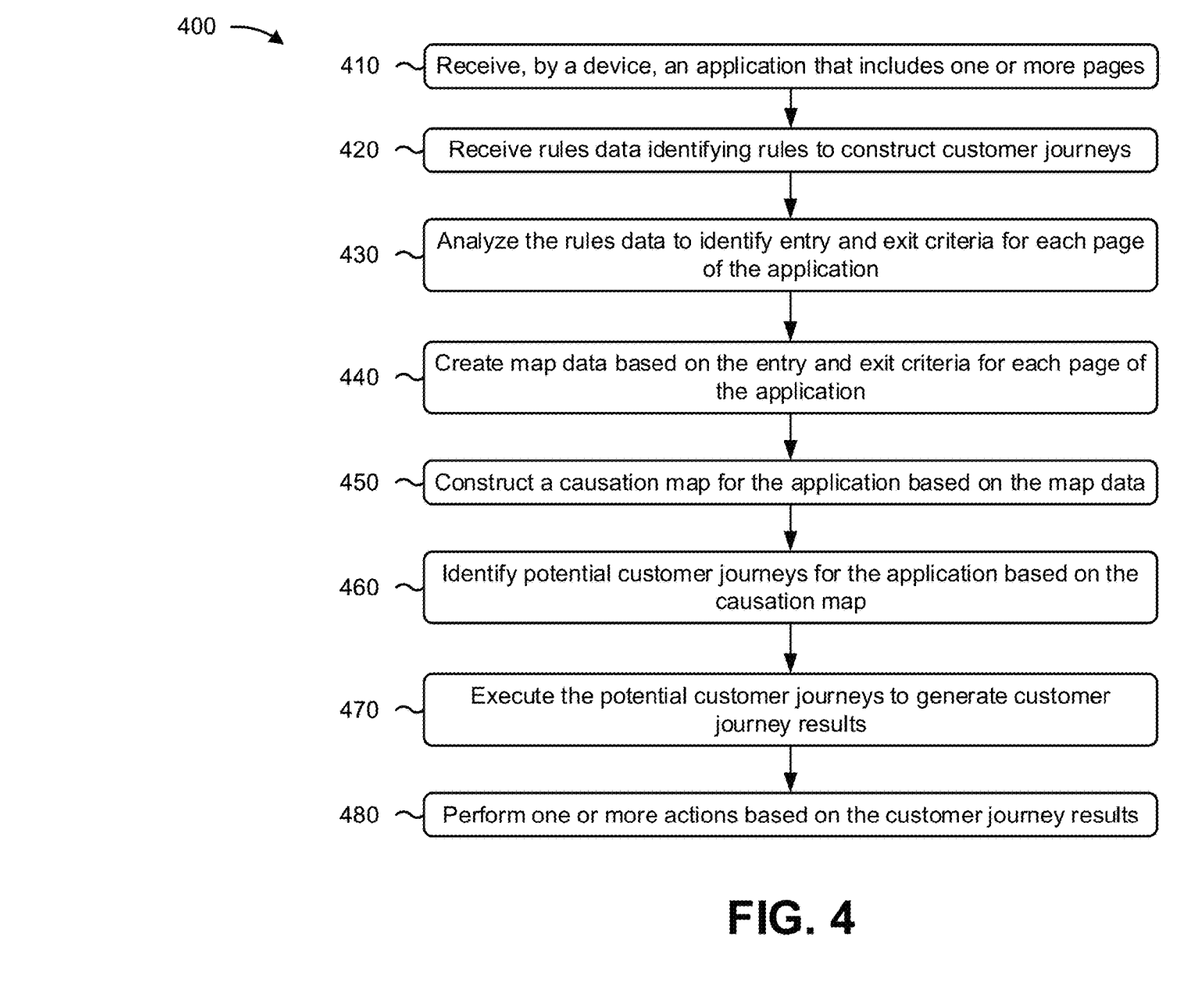
FIG. 4 is a flowchart of an example process relating to generating customer journeys for an application based on process management rules.

FIG. 4 is a flowchart of an example process 400 associated with generating customer journeys for an application based on process management rules. In some implementations, one or more process blocks of FIG. 4 may be performed by a device (e.g., the customer journey system 110). In some implementations, one or more process blocks of FIG. 4 may be performed by another device or a group of devices separate from or including the device, such as a user device (e.g., the user device 105) and/or a server device (e.g., the server device 105). Additionally, or alternatively, one or more process blocks of FIG. 4 may be performed by one or more components of device 300, such as the processor 320, the memory 330, the storage component 340, the input component 350, the output component 360, and/or the communication component 370.

As shown in FIG. 4, process 400 may include receiving an application that includes one or more pages (block 410). For example, the device may receive an application that includes one or more pages, as described above.

As further shown in FIG. 4, process 400 may include receiving rules data identifying rules to construct customer journeys (block 420). For example, the device may receive rules data identifying rules to construct customer journeys, as described above.

As further shown in FIG. 4, process 400 may include analyzing the rules data to identify entry and exit criteria for each page of the application (block 430). For example, the device may analyze the rules data to identify entry and exit criteria for each page of the application, as described above.

As further shown in FIG. 4, process 400 may include creating map data based on the entry and exit criteria for each page of the application (block 440). For example, the device may create map data based on the entry and exit criteria for each page of the application, as described above.

As further shown in FIG. 4, process 400 may include constructing a causation map for the application based on the map data (block 450). For example, the device may construct a causation map for the application based on the map data, as described above.

As further shown in FIG. 4, process 400 may include identifying potential customer journeys for the application based on the causation map (block 460). For example, the device may identify potential customer journeys for the application based on the causation map, as described above.

As further shown in FIG. 4, process 400 may include executing the potential customer journeys to generate customer journey results (block 470). For example, the device may execute the potential customer journeys to generate customer journey results, as described above.

As further shown in FIG. 4, process 400 may include performing one or more actions based on the customer journey results (block 480). For example, the device may perform one or more actions based on the customer journey results, as described above.

Process 400 may include additional implementations, such as any single implementation or any combination of implementations described below and/or in connection with one or more other processes described elsewhere herein.

In a first implementation, the map data includes data identifying interrelations between pages of the application.

In a second implementation, alone or in combination with the first implementation, the customer journey results indicate one or more of an invalid customer journey of the potential customer journeys, or a valid customer journey of the potential customer journeys.

In a third implementation, alone or in combination with one or more of the first and second implementations, process 400 includes receiving a change to the rules data and modifying the potential customer journeys for the application based on the change to the rules data.

In a fourth implementation, alone or in combination with one or more of the first through third implementations, executing the potential customer journeys to generate the customer journey results includes generating tests from the potential customer journeys, and executing the tests to generate the customer journey results.

In a fifth implementation, alone or in combination with one or more of the first through fourth implementations, the rules data further includes a decision table associated with the rules to construct the customer journeys.

In a sixth implementation, alone or in combination with one or more of the first through fifth implementations, process 400 includes validating the rules data prior to analyzing the rules data to identify the entry and exit criteria for each page of the application.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

In a seventh implementation, alone or in combination with one or more of the first through eighth implementations, the potential customer journeys are associated with one or more of a cross-channel customer transaction experience, an end-to-end orchestrated customer journey, a communications customer journey, or a personalized offer.

In an eighth implementation, alone or in combination with one or more of the first through seventh implementations, creating the map data based on the entry and exit criteria for each page of the application includes processing the entry and exit criteria for each page of the application, with a model, to eliminate loops and to create the map data.

In a ninth implementation, alone or in combination with one or more of the first through eighth implementations, performing the one or more actions includes identifying one or more invalid customer journeys based on the customer journey results, and correcting the one or more invalid customer journeys.

In a tenth implementation, alone or in combination with one or more of the first through ninth implementations, performing the one or more actions includes one or more of providing information about the customer journey results for display, modifying the application based on the customer journey results, or modifying one or more of the rules based on the customer journey results.

In an eleventh implementation, alone or in combination with one or more of the first through tenth implementations, performing the one or more actions includes removing a portion of the application based on the customer journey results, and replacing the portion of the application with new application code.

In a twelfth implementation, alone or in combination with one or more of the first through eleventh implementations, performing the one or more actions includes determining a correction to the application based on the customer journey results, and implementing the correction to the application.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
    receiving, by a device, an application that includes one or more pages;
    receiving, by the device, rules data identifying rules and available paths to construct customer journeys via the one or more pages;
    validating, by the device, the rules data based on comparing the rules data to historical rules data;
    analyzing, by the device and based on validating the rules data, the rules data to identify entry criteria and exit criteria for each page of the application,
        wherein the entry criteria and exit criteria for each page of the application includes one or more respective conditions to be satisfied in order to present each respective page of the application, and
        wherein analyzing the rules data comprises:
            analyzing code of the application for conditional statements to identify conditions associated with the application,
            determining a first subset of the conditions associated with entering a first page, of the one or more pages, and a second subset of the conditions associated with exiting a second page, of the one or more pages, and
            labeling the first subset of the conditions as entry criteria for the first page and the second subset of the conditions as exit criteria for the second page;
    creating, by the device, map data based on the entry criteria and exit criteria for each page of the application;
    constructing, by the device, a causation map for the application based on the map data;
    identifying, by the device, potential customer journeys for the application based on the causation map;
    executing, by the device, the potential customer journeys to generate customer journey results; and
    performing, by the device, one or more actions based on the customer journey results.

2. The method of claim 1, wherein the map data includes data identifying interrelations between pages of the application.

3. The method of claim 1, wherein the customer journey results indicate one or more of:
    an invalid customer journey of the potential customer journeys, or
    a valid customer journey of the potential customer journeys.

4. The method of claim 1, further comprising:
    receiving a change to the rules data; and
    modifying the potential customer journeys for the application based on the change to the rules data.

5. The method of claim 1, wherein executing the potential customer journeys to generate the customer journey results comprises:
    generating tests from the potential customer journeys; and
    executing the tests to generate the customer journey results.

6. The method of claim 1, wherein the rules data further includes a decision table associated with the rules to construct the customer journeys.

7. A device, comprising:
    one or more processors configured to:
        receive an application that includes one or more pages;
        receive rules data identifying rules and available paths to construct customer journeys and a decision table associated with the rules;
        validate the rules data based on comparing the rules data to historical rules data;
        analyze the rules data to identify entry criteria and exit criteria for each page of the application,
            wherein the entry criteria and exit criteria for each page of the application includes one or more respective conditions to be satisfied in order to present each respective page of the application, and
            wherein the one or more processors, to analyze the rules data, are configured to:
                analyze code of the application for conditional statements to identify conditions associated with the application,
                determine a first subset of the conditions associated with entering a first page, of the one or more pages, and a second subset of the conditions associated with exiting a second page, of the one or more pages, and label the first subset of the conditions as entry criteria for the first page and the second subset of the conditions as exit criteria for the second page;

create map data based on the entry criteria and exit criteria for each page of the application;

construct a causation map for the application based on the map data;

identify potential customer journeys for the application based on the causation map;

execute the potential customer journeys to generate customer journey results; and perform one or more actions based on the customer journey results.

8. The device of claim 7, wherein the potential customer journeys are associated with one or more of:

a cross-channel customer transaction experience, an end-to-end orchestrated customer journey, a communications customer journey, or a personalized offer.

9. The device of claim 7, wherein the one or more processors, to create the map data based on the entry criteria and exit criteria for each page of the application, are configured to:

process the entry criteria and exit criteria for each page of the application, with a model, to eliminate loops and to create the map data, wherein the model is configured to determine whether any of the entry criteria and exit criteria create loops between the one or more pages.

10. The device of claim 7, wherein the one or more processors, to perform the one or more actions, are configured to:

identify one or more invalid customer journeys based on the customer journey results; and correct the one or more invalid customer journeys.

11. The device of claim 7, wherein the one or more processors, to perform the one or more actions, are configured to one or more of:

provide information about the customer journey results for display;

modify the application based on the customer journey results; or modify one or more of the rules based on the customer journey results.

12. The device of claim 7, wherein the one or more processors, to perform the one or more actions, are configured to:

remove a portion of the application based on the customer journey results; and replace the portion of the application with new application code.

13. The device of claim 7, wherein the one or more processors, to perform the one or more actions, are configured to:

determine a correction to the application based on the customer journey results; and implement the correction to the application.

14. A non-transitory computer-readable medium storing a set of instructions, the set of instructions comprising:

one or more instructions that, when executed by one or more processors of a device, cause the device to:

receive an application that includes one or more pages;

receive rules data identifying rules and available paths to construct customer journeys via the one or more pages;

validate the rules data based on comparing the rules data to historical rules data;

analyze the rules data to identify entry criteria and exit criteria for each page of the application, wherein the entry criteria and exit criteria for each page of the application includes one or more respective conditions to be satisfied in order to present each respective page of the application, and wherein the one or more instructions, that cause the device to analyze the rules data, cause the device to:

analyze code of the application for conditional statements to identify conditions associated with the application, determine a first subset of the conditions associated with entering a first page, of the one or more pages, and a second subset of the conditions associated with exiting a second page, of the one or more pages, and label the first subset of the conditions as entry criteria for the first page and the second subset of the conditions as exit criteria for the second page;

create map data based on the entry criteria and exit criteria for each page of the application;

construct a causation map for the application based on the map data;

identify potential customer journeys for the application based on the causation map;

generate tests from the potential customer journeys;

execute the tests to generate customer journey results; and perform one or more actions based on the customer journey results.

15. The non-transitory computer-readable medium of claim 14, wherein the one or more instructions further cause the device to:

receive a change to the rules data; and modify the potential customer journeys for the application based on the change to the rules data.

16. The non-transitory computer-readable medium of claim 14, wherein the one or more instructions, that cause the device to create the map data based on the entry criteria and exit criteria for each page of the application, cause the device to:

process the entry criteria and exit criteria for each page of the application, with a model, to eliminate loops and to create the map data, wherein the model is configured to identify relationships between the entry criteria for the first page and the exit criteria for the second page.

17. The non-transitory computer-readable medium of claim 14, wherein the one or more instructions, that cause the device to perform the one or more actions, cause the device to:

identify one or more invalid customer journeys based on the customer journey results; and correct the one or more invalid customer journeys.

18. The non-transitory computer-readable medium of claim 14, wherein the one or more instructions, that cause the device to perform the one or more actions, cause the device to one or more of:

provide information about the customer journey results for display;

modify the application based on the customer journey results;

modify one or more of the rules based on the customer journey results;

remove and replace a portion of the application based on the customer journey results; or determine and implement a correction to the application based on the customer journey results.

19. The method of claim 1, wherein validating the rules data based on comparing the rules data to historical rules data comprises:

comparing the rules of the rules data to historical rules of the historical rules data.

20. The method of claim 1, wherein validating the rules data based on comparing the rules data to historical rules data comprises:

comparing available paths associated with the application to historical available paths associated with a similar application.

* * * * *